J. BOZORTH.
Box-Trimming Machine.
No. 205,994. Patented July 16, 1878.
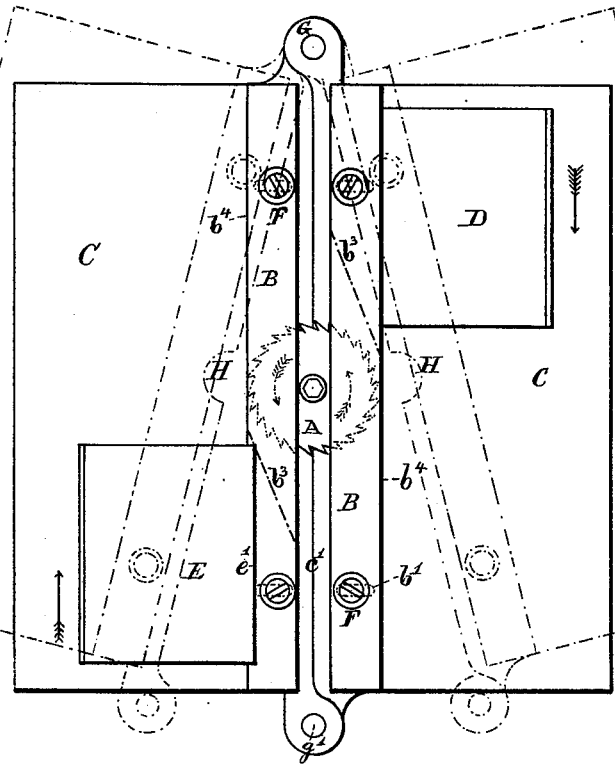
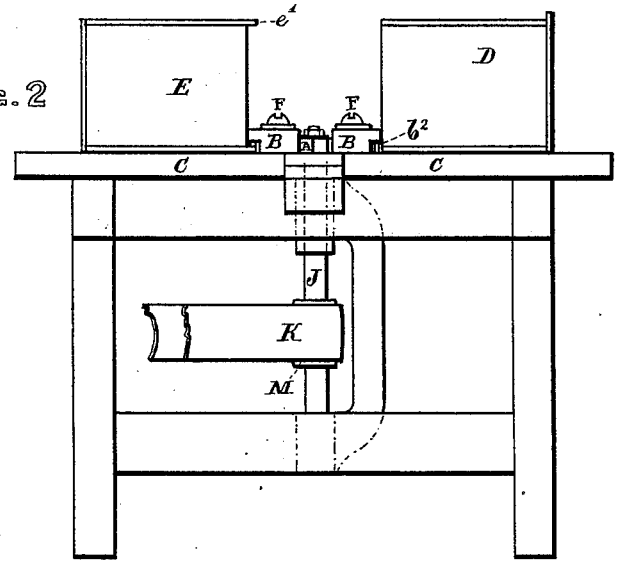

UNITED STATES PATENT OFFICE.

JOHN BOZORTH, OF PHILADELPHIA, PENNSYLVANIA.

IMPROVEMENT IN BOX-TRIMMING MACHINES.

Specification forming part of Letters Patent No. 205,994, dated July 16, 1878; application filed June 6, 1878.

*To all whom it may concern:*

Be it known that I, JOHN BOZORTH, of 2528 Federal street, Philadelphia, Pennsylvania, have invented a new and useful Improvement in Machines for Edging off the Sides of Boxes flush with the ends of same, which improvement is fully set forth in the following specification and accompanying drawing, in which—

Figure 1 is a plan of the machine. Fig. 2 is a front elevation.

The invention consists in the combination, as hereinafter described, of a circular saw mounted on a vertical shaft, one or more guards adapted to be moved in parallel lines toward or from the center of the saw, as desired, and a table centrally divided, and hinged in a manner permitting the saw to be easily reached by the operator when the table is parted or spread.

A is the saw, supported on shaft J, and driven by belt K on pulley M. B is the guard, having a rabbet edge, $b^2$, cut on one side. Dotted lines $b^3$ show a channel cut on the under side, in which the saw works, which permits the shavings to pass out and prevents the saw clogging up. F is a screw to keep the guard in position, and slots $b^1$ enable me to adjust the face of the guard to the edge of the teeth of the saw when the saw becomes reduced in size by wear and refiling. C is the bench or table, divided at line $c'$ and hinged at G. A pin, $g'$, keeps it in position when closed. The table is also shown separated in Fig. 1 by dotted lines.

By being made in this way, the operator is enabled to get at the saw for oiling or repairing it more readily than if hinged to lift up.

The hole shown in halves at H envelops the collar on the under side of the saw, and by closing up in this manner under the saw prevents any dust or shavings falling underneath and filling up the journals. It also keeps the belt clean and prevents it from slipping.

E is a box to be trimmed. The projections $e'$ on its sides extend above the ends. It is shown in position, with the overlapping side or projection $e'$ next the table and in the groove $b^2$, with the end of the box resting against the line $b^4$, or face of the guard. To be trimmed, it is pushed forward, in the direction indicated by the arrow, toward the revolving saw A, the edge of which, being flush with the face of the guard, cuts the side of the box even with its ends. The box can then be turned end for end and passed by the saw again, as many times as necessary, until it is finished; or, where two guards are used, as shown in the drawing, it can be placed like box D, and run off on the other guard. By using two guards I am enabled to trim two boxes at the same time, the boxes being worked from opposite ends. Thus, by using two guards, I make a double machine.

In machines in use for this purpose a circular saw has not before been used. In my improvement I use a saw because it can be fed much faster without spoiling or tearing the wood, and passes over knots without tearing them out much better than a cutter-head.

I claim—

The combination, with a circular saw mounted on a vertical shaft, of one or more guards adapted to be moved in parallel lines toward or from the center of said shaft and secured in the desired position, and a centrally-divided and hinged table, all arranged substantially as and for the purposes specified.

JOHN BOZORTH.

Witnesses:
JOHN F. GRANT,
THOS. DALLAS.